United States Patent [19]

Quigley et al.

[11] 4,208,192

[45] Jun. 17, 1980

[54] SONIC SPRAY OF $H_2SD_4$ IN A SWIRLING HEATED AIR STREAM

[75] Inventors: William A. Quigley, Greenwich; Paul H. Sorenson, Fairfield, both of Conn.

[73] Assignee: UOP Inc., Des Plaines, Ill.

[21] Appl. No.: 955,554

[22] Filed: Oct. 27, 1978

[51] Int. Cl.[2] .......... B03C 3/00

[52] U.S. Cl. .......... 55/5; 55/92; 55/238; 239/102; 239/405; 261/79 A; 423/215.5

[58] Field of Search .......... 55/5, 92, 235–238; 423/215.5; 239/403, 405; 261/79 A

[56] References Cited

U.S. PATENT DOCUMENTS

| | | | |
|---|---|---|---|
| 1,441,713 | 1/1923 | Prosser | 55/5 |
| 3,704,569 | 12/1972 | Hardison et al. | 55/5 |
| 3,724,180 | 4/1973 | Morton et al. | 55/410 |
| 3,860,401 | 1/1975 | Clark et al. | 55/92 |
| 4,058,372 | 11/1977 | Delamater | 55/5 |
| 4,070,424 | 1/1978 | Olson et al. | 55/5 |

FOREIGN PATENT DOCUMENTS

| | | | |
|---|---|---|---|
| 1014789 | 8/1957 | Fed. Rep. of Germany | 261/79 A |
| 429604 | 6/1935 | United Kingdom | 261/79 A |

*Primary Examiner*—Norman Yudkoff

*Attorney, Agent, or Firm*—James R. Hoatson, Jr.; Barry L. Clark; William H. Page, II

[57] ABSTRACT

In order to reduce the electrical resistance of entrained fine particles of fly ash resulting from the burning of low sulfur coal and to enhance the efficiency of their collection by an electrical precipitator means, there is a conditioning of the particles carried in the flue gas stream by having a vapor of $H_2SO_4$ condensed and adsorbed on the particles themselves. Sulfuric acid at ambient temperature is mixed with air in an acoustic nozzle to form a mist having an average particle size of about 10 microns which is injected uniformly into a cyclonically flowing stream of hot gas in a chamber located adjacent an upstream inlet duct portion of the precipitator unit. The hot gas in the chamber vaporizes the acid which is then injected into the precipitator inlet duct so that the acid can condense on the particles. The hot gas is preferably obtained from the combustion air preheater.

17 Claims, 7 Drawing Figures

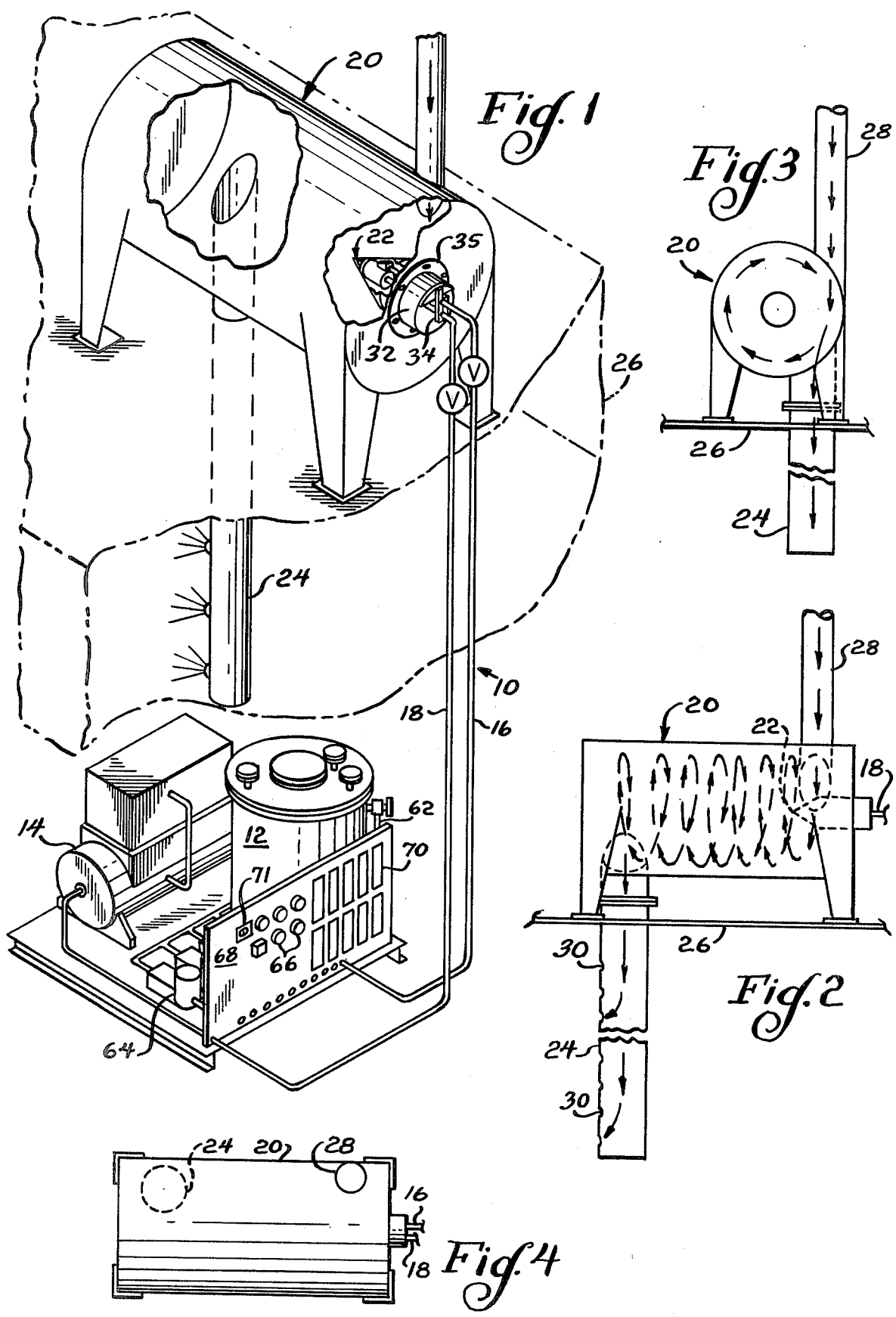

4,208,192

SONIC SPRAY OF H₂SD₄ IN A SWIRLING HEATED AIR STREAM

BACKGROUND OF THE INVENTION

This invention relates to a conditioning system for preparing and introducing sulfuric acid ($H_2SO_4$) into a particle laden flue gas stream so as to substantially reduce the resistivity of the fine fly ash particulates to in turn enhance their removal from the gas stream by electrical precipitator means. The invention is an improvement upon the invention disclosed and claimed in U.S. Pat. No. 4,070,424 assigned to a common assignee.

It has been found, and is quite well known, that fly ash containing streams from the burning of coal, or from the burning of any fossil fuels, will have a certain amount of electrical resistance or "resistivity" developed in the particles such that an inefficient electrical precipitation thereby results. It is also well known that flue gas streams will have varying quantities of sulfur trioxide ($SO_3$) present naturally and that when a sufficient quantity of $SO_3$ or $H_2SO_4$ is present in the gas stream or with the fly ash the resistivity of the particles to giving up their electrostatic charges will be low enough that good precipitation results can be obtained.

With ever increasing state and federal pressure on industrial and utility companies to improve their emissions from coal fired boilers and comply with emission standards, many have switched to the use of low sulfur coal to reduce the amount of $SO_2$ present in the flue gases. Unfortunately, while the flue gas from high sulfur coal contains sufficient $SO_3$ to provide the proper resistivity, low sulfur coal lacks sufficient $SO_3$ in the flue gas to provide the proper resistivity to the resulting fly ash to permit its effective precipitation. Thus, these users are more than ever seeking immediate and low cost solutions to poor fly ash collection efficiencies of their existing electrostatic precipitators. Their possible options are to expand or rebuild their existing equipment to handle the type of flue being fired or by going to gas conditioning of the boiler combustion gases. Gas conditioning is used to bring the exhaust fly ash within a more desirable resistivity range for precipitator collection. Gas conditioning is economically more attractive to industry due to its relatively low purchase price when compared to the purchase price of an enlarged or new precipitator. Availability is a second advantage to this approach in that the system can be installed fairly quickly and with minimal load disturbance.

Various methods of gas conditioning are presently available. The more effective conditioning agents are $H_2SO_4$ and $NH_3$. A system which is presently marketed and which is described in U.S. Pat. No. 3,704,569 uses vaporized $H_2SO_4$ as its conditioning agent. With this system, large volumes of dry air are heated to a temperature of approximately 260° C. to be above the vaporizing temperature of about 235° C. and then mixed with the acid in a glass lined vaporizing chamber. The hot vaporized acid is then conveyed to injection lances by means of glass lined pipe and uniformly dispersed in the flue gas. Although such a system provides excellent conditioning of the flue gases, it is quite expensive to produce due to the fact that the acid is transported in a hot vaporized state and is extremely corrosive, with the result that expensive, corrosion-resistant materials are required to be used. Furthermore, the system is expensive to operate since an excessive amount of energy must be used to heat the air to a point where it can vaporize the acid.

A second method of gas conditioning is that of utilizing $SO_3$ directly. This system functions much the same as the aforementioned vaporizer except that heat is applied to the liquid $SO_3$ in an evaporator chamber resulting in the $SO_3$ vapor. The $SO_3$ is unstable and must be heated in storage tanks, pumps and flow lines. Since any leakage of liquid becomes gaseous, the system is quite hazardous.

A third method is disclosed in U.S. Pat. No. 1,441,713 where acid is proposed to be introduced in a gas stream in the form of very fine particles and specifically, in the form of a fume which is formed by boiling fuming sulfuric acid. Although the patentee broadly contemplates that the acid be introduced by some suitable form of atomizing device, no apparatus is disclosed other than the boiling pan and burners. In view of the extremely corrosive and dangerous nature of fuming sulfuric acid, it is doubtful that the aforesaid method would have ever been used. Certainly if it was it would have been expensive to provide corrosion-resistant materials and to provide the necessary heat for boiling the acid.

A fourth and more complex method of gas conditioning is that of burning liquid sulfur. The $SO_2$ generated by the sulfur burner is passed through a catalyst that converts the $SO_2$ to $SO_3$. The final objective of all four methods is to disperse $H_2SO_4$ in the precipitator flue gases and condition same to a more desirable resistivity for precipitator collection. The dispersion must be very fine since an electrical precipitator is an effective collector of sulfuric acid mist. As noted above, conditioning usually involves the injection of $H_2SO_4$ or $SO_3$ in the flue gas stream in vaporized form, and the injection of acid in liquid form apparently has not been done commercially, probably for the reason that one would expect that liquid injection would not condition beyond the first field of a precipitator since the acid particles would be collected, leaving the remaining fields current suppressed due to the presence of unconditioned fly ash accumulated on the electrodes. Furthermore, until the rather recent development of sonic nozzles, the available mechanically atomized spray nozzles were not able to produce a fine enough spray to be considered as a substitute for vapor injection. Mechanical nozzles typically are poor in their ability to be turned down to low flows. Also, the required high liquid pressures and small orifices used would increase the likelihood of erosion and plugging problems.

The invention disclosed in said U.S. Pat. No. 4,070,424 was developed to avoid the disadvantages of the aforementioned systems and provides for injecting liquid acid directly into the flue gas stream. However, extensive testing has indicated that under gas flow conditions the atomized plume of sulfuric acid can collapse and cause agglomeration of the mist into droplets which can wet the internal duct structure and cause undesirable ash buildup.

SUMMARY OF THE INVENTION

It can be readily appreciated that although the four enumerated prior art systems for gas conditioning by injection of $SO_3$ or $H_2SO_4$ provide satisfactory results, they achieve these results at considerable expense in terms of capital equipment requirements and in terms of the excessive amounts of energy which they utilize. Obviously, it would be desirable to have a system which can be produced and operated at a lower cost and it is among the objects of the present invention to provide such a system.

By the apparatus and method of the present invention it is possible to achieve $H_2SO_4$ gas conditioning performance levels equivalent to the prior art levels of vaporizing systems, but at much lower costs in terms of equipment requirements and in terms of day to day operating expense requirements, particularly for energy. Basically, the conditioning process consists of pumping a metered volume of ambient temperature 93–98% $H_2SO_4$ through an atomizing nozzle directly into a cyclone chamber through which a hot gas stream passes. The nozzle creates a very fine $H_2SO_4$ mist having an average particle size of about 10 microns which is vaporized by the cyclonic flow of hot gas and then fed directly into the inlet duct of a precipitator. Acoustic standing wave energy set up by an atomizing air supply at the nozzle tip provides the energy necessary to dissociate the larger $H_2SO_4$ molecules into smaller droplets. The system has the distinct advantage of minimizing equipment and conveying line corrosion in that the $H_2SO_4$ is not conveyed in a vaporized form except between the cyclone chamber and the immediately adjacent inlet duct. $H_2SO_4$ is in its most corrosive state under vaporized conditions. Accordingly, conveying the acid in liquid form to the nozzles enables the equipment to be constructed of more available and inexpensive materials. Only the nozzles and the pipe or lance connecting the chamber to the interior of the duct must be constructed of corrosion-resistive material capable of resisting the high temperature environment in the chamber and flue and the atomizing aeration of the acid at the nozzle. The chamber and the nozzle holder may be of low carbon steel. Since neither the air nor the acid entering the nozzle needs to be heated, the operating cost as well as construction cost will be substantially less than for other conventional gas conditioning systems. Hot gas must be supplied to the cyclone chamber but the hot gas may be obtained from the combustion air preheater at a temperature of about 600° F. which is well above the approximate 330° F. dewpoint temperature of the sulfuric acid within the chamber when the acid vapor concentration is about 6000 ppm. To avoid localized condensation of acid vapor and to maintain the acid in the vapor state to the end of the lance which admits the acid vapor to the inlet duct of the precipitator, the temperature should be above 500° F. Under ideal conditions, the hot gas does not even need to be moved by a blower since natural convection can drive it due to the positive pressure at the preheater and the negative pressure at the inlet duct to the precipitator. Even when natural convection is insufficient so that a fan is desirable, little additional cost is generated as compared to the savings gained by using air from the preheater. The volume of gas required is quite small compared to the available volume. For example, we have found that 540 SCFM of air at 500° F. can vaporize three gallons per hour of acid from one nozzle.

In order to avoid the possibility of the collapse of the acid mist plume and the agglomeration of the mist into droplets when the mist is injected directly into a moving stream of air as in U.S. Pat. No. 4,070,424, we have placed the nozzle in a separate environment from that of the duct where the air velocity can be controlled, regardless of changes in boiler operations. By insuring that the air temperature in the separate environment is sufficiently high to vaporize the acid mist, we have found there is no possibility of droplets being formed in the flue gas duct. It is preferable that the hot gas provided to the separate environment be provided by tapping off a small portion of the hot air which is supplied from the precombustion preheater to the boilers. In a typical boiler in a power plant, the flue gases leave the boiler at approximately 750° F. and are passed through an air preheater in which ambient outside air moving through the preheater is heated to a temperature of approximately 650° F. The extraction of heat causes the temperature of the flue gas to be lowered to approximately 350° F. before it enters the duct leading to the electrostatic precipitator.

We have found that it is important in order to achieve vaporization of relatively large quantities of acid mist that a relatively large volume of hot air be provided at a low velocity. To accomplish this, we utilized a cylindrical chamber 2.5 feet in diameter by 5.5 feet long with the inlet and outlet piping entering the chamber tangentially near each of its ends so as to cause the hot air to travel in a helical or cyclonic manner within the chamber. We positioned the nozzle centrally in the inlet end of the chamber so that the mist plume generated by the nozzle would be peeled off by the cyclonic air flow and vaporized by the air temperature prior to being carried from the chamber to the duct. As previously noted, we found that by providing an air flow of about 540 SCFM per nozzle or chamber at a temperature of at least about 500° F., we could vaporize three gallons per hour of acid. This is sufficient acid to treat a flue gas volume of approximately 115,000 SCFM. Some boilers have a much larger volume of flue gas than this. For example, a 360 megawatt boiler could have a flue gas volume of 844,000 SCFM, so that on such a unit it would be necessary to utilize several nozzles and chambers. Placement of such multiple chambers would be no problem since a 360 megawatt unit might have a flue duct having a width of 60 feet permitting the cyclone chambers to be placed side by side across the width of the duct without interferring with each other. This external mounting of the acid injection system permits easy servicing since only the final exit pipe or lance for the vapor must be positioned inside the precipitator duct.

In the course of experimenting with varying locations of the nozzle within the cyclone chamber, we found the location of the nozzle to be very critical to achieving uniform vaporization of the acid mist. Likewise, we found that the shape of the nose on the nozzle holder is also critical. To minimize the length of the chamber, it would seem desirable to inject the mist as close to the inlet end of the chamber as possible. However, we found that such an upstream placement of the nozzle concentrated the mist on the nozzle holder in a sufficient amount that it would drip to the floor of the chamber and become evaporated. This undesirable concentration was found to be a result of the acid mist being blown back toward the nozzle holder as a result of impingement of its mist pattern by the inlet hot air stream. This problem was solved by moving the nozzle to a position about 2" forward of the downstream edge of the inlet pipe. As previously noted, it was also found that the shape of the nose on the nozzle holder is quite critical. In order to mount the nozzle within the chamber near the inlet end of the chamber a hollow, cylindrical nozzle holder member is mounted through the inlet end of the chamber. The nozzle holder member is provided with a complementary supporting surface to which the nozzle member may be attached with an O-ring at its forward end while the rear end of the nozzle member is held by clamps attached to its air and acid lines. Experimentation with several configurations of the nose portion of the nozzle holder showed that any time any frontal area was permitted to exist between the nose cone portion and the nozzle, mist would accumulate on the frontal area. By changing the nose cone angle to 60° and bringing its forward edge tangent to the nozzle angle, the frontal area was reduced effectively to zero, thus eliminating any accumulation of acid mist.

In operation in a plant unit at ambient temperature, acid from a day storage tank is filtered prior to entering the system acid pump. Depending upon a system feed control signal, a volume of $H_2SO_4$ corresponding with the desired injection rate is delivered to the nozzles. From the metering equipment the acid then passes through flow indicators such as rotameters which enable the operator to monitor the flow to each chamber and lance. Pressure gauges are provided to insure proper liquid and air pressure to the nozzles. The acid is passed through the nozzles where it mixes with the dry atomizing air and is converted to a fine acid mist with an average droplet size of about 10 microns. A controlled air pressure of at least about 10 psig higher than the acid pressure is maintained to the nozzles to insure proper atomizing energy.

A chemical feedback signal downstream of injection may be used to determine the $H_2SO_4$ content of the flue gas and signal the metering equipment to maintain the desired concentration. For example, a Land Dewpoint meter would be suitable for this purpose. The maximum injection concentration will be limited to the dew point temperature of the flue gas and will be controlled at a safe margin from dew point. Alternatively, and especially where the coal used in a boiler has a uniform $SO_3$ content, the injection rate of acid can be controlled in response to changes in the plant load to provide 15-30 ppm acid in the flue gas.

Tests of the acid mist injection system of the present invention have indicated that substantial improvement in precipitator performance can be realized using the above system.

BRIEF DESCRIPTION OF THE DRAWINGS

FIG. 1 is an isometric view of a skid showing the various structural elements of the gas conditioning system which are connected to injection lances in a precipitator inlet duct;

FIG. 2 is a side view of the acid atomizing cyclone chamber;

FIG. 3 is an end view of the acid atomizing cyclone chamber;

FIG. 4 is a top view of the acid atomizing cyclone chamber;

DESCRIPTION OF THE PREFERRED EMBODIMENT

Figure 5:
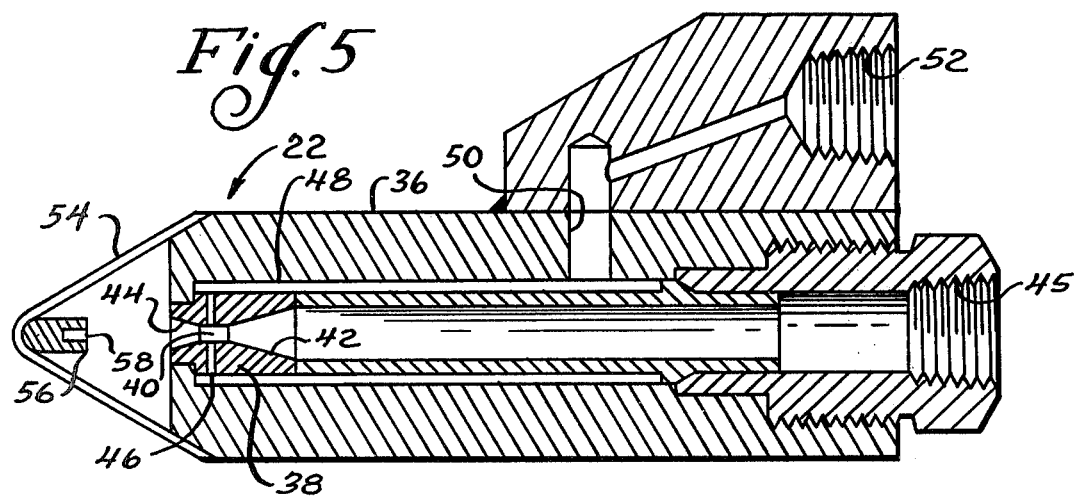
FIG. 5 is an axial cross-section of an atomizing injection nozzle.

Referring to FIG. 1, the improved gas conditioning apparatus shown generally at 10 includes an acid day tank 12 and an air tank 14. Acid lines 16 and an air line 18 are connected to a plurality of atomizing chamber assemblies (only one being shown) indicated generally at 20 which have acid mist injection nozzles 22 extending thereinto and acid vapor injection lances 24 extending therefrom. The lances 24 are adapted to pass through the top of a duct member 26 at a position in a flue gas stream which is upstream from an electrostatic precipitator (not shown). The particular position upstream should be such that the acid vapor will be uniformly dispersed by the time it reaches the precipitator and the number and position of the lances should be selected to provide uniform dispersion. Hot gases, preferably from a combustion air preheater (not shown) are introduced into the chamber 20 through inlet pipe 28 (FIGS. 1-4). The gases travel in a helical or cyclonic fashion from one end of the chamber to the other where they exit through lance 24 and are distributed through openings 30 into the flue gas stream in the duct 26. The nozzle 22 is mounted at the tip of the nozzle holder 32 at a point on the axis of the chamber 20 which is preferably about 2" downstream of the inlet pipe 28. A clamp 34 carried by the nozzle holder 32 engages the air and acid lines 18 and 16 to maintain the nozzle position fixed relative to the nozzle holder. A flange 35 welded to the nozzle holder 32 affixes the nozzle holder to the chamber 20.

The nozzle member 22 is shown in detail in FIG. 5. The nozzle includes a main body portion 36 preferably formed of tantalum and having positioned within it an orifice member 38 containing an orifice 40 and including an inlet cone portion 42 and an outlet cone portion 44. The orifice 40 acts as a venturi to increase the velocity of the air drawn in through threaded opening 45 by which the nozzle is attached to air line 18 and to assist in drawing liquid acid through two pairs of opposed holes 46 which communicate with the annular acid-containing reservoir 48 defined by the orifice member 38 and the body 36 and by the acid inlet opening 50 which communicates with an opening 52 attached to acid line 16. Positioned at the outer end of the nozzle 22 are a pair of support arms 54 which carry and support a resonator cup member 56 having a cavity 58. The nozzle 22 produces an intense field of sonic energy which breaks the acid particles up into an extremely fine mist having an average particle size of about 10 microns. The model is preferably made in a shape similar to the Model 052 nozzle sold by Sonic Development Corporation of Upper Saddle River, New Jersey. The theory of operation of such nozzles is generally explained in U.S. Pat. No. 3,240,254, which patent is incorporated by reference herein. To resist corrosion, the nozzle 22 is preferably made of tantalum or other material capable of withstanding the corrosive environment produced by the liquid acid within the nozzle and the hot acid mist or vapor which can contact the exterior portions of the nozzle. Materials such as stainless steel and Hastelloy normally offered by the nozzle manufacturer for corrosion resistance are of little use in a hot acid environment since they would corrode very quickly.

Figure 6:
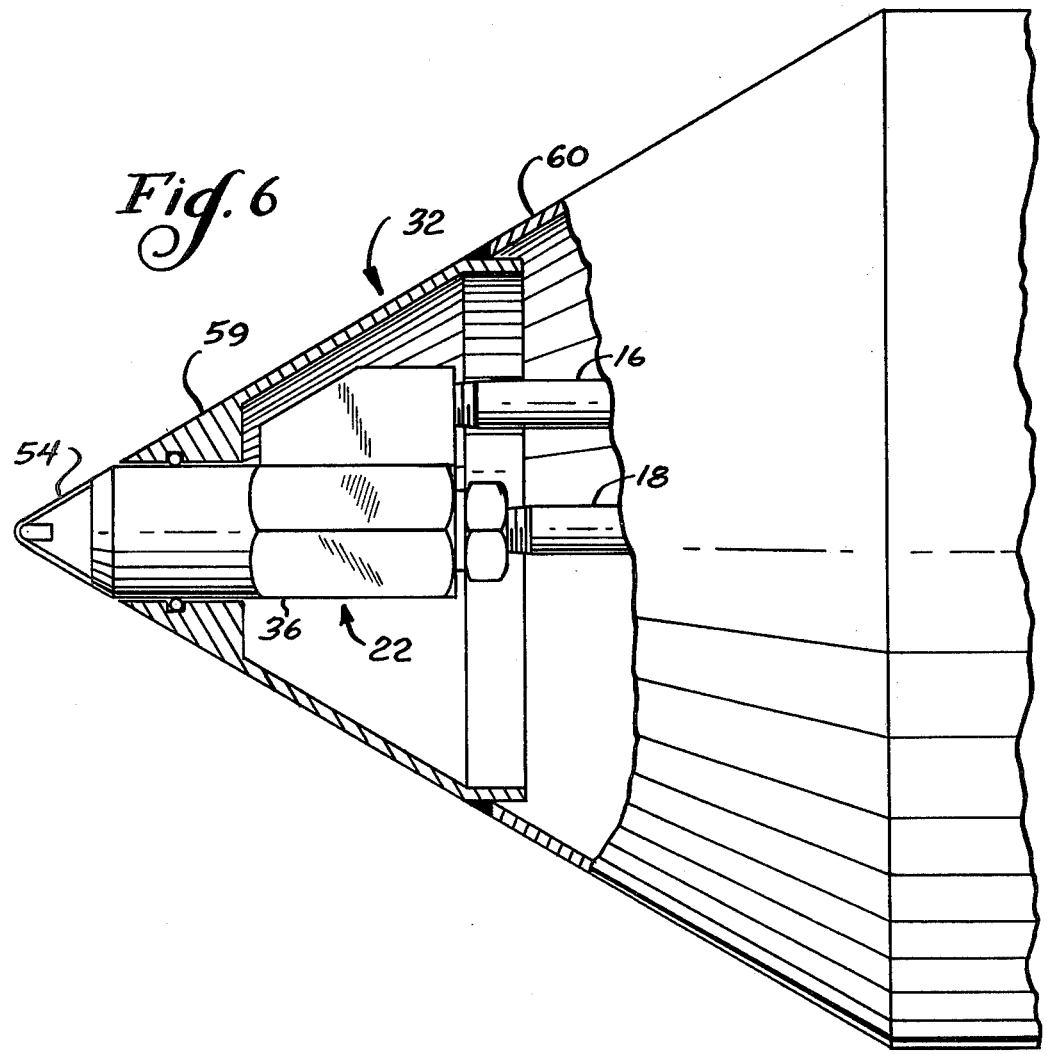
FIG. 6 is a side view partially broken away and partly in section, of an injection nozzle mounted in a nozzle holder.

FIG. 6 illustrates the manner in which the nozzle 22 is mounted in the nozzle holder 32. The nozzle holder includes a machined nose portion 59 which is welded to a formed sheet metal portion 60. An O-ring seal 61 located in a groove in the nose portion supports the forward portion of the nozzle 22 while the rearward portion is supported by the clamp 34 (FIG. 1) which contacts pipes 16 and 18. As previously discussed, the nose cone portion 59 preferably has an included angle of about 60° and is flush and aligned with the nozzle 22 as shown in the drawing.

The system for supplying acid to the nozzles 22 includes a day tank 12 having a sight gauge 62 (FIG. 1) and high and low level alarm systems connected to indicators and a horn (not shown). A plurality of metering pumps 64 are controled by switches 66, with each pump capable of supplying acid to two acid lines 16.

To provide the operator with as much information as possible, the control panel 68 preferably includes acid flow indicators 70, a tank liquid level indicator, a tank temperature indicator, a system "on" indicator, a power "on" indicator and pressure gauges for inlet acid, inlet air, outlet acid and outlet air. A temperature set point gauge 71 is also provided for setting the lowest temperature of the flue gases at which the system will operate. This keeps the system from operating below the dew point of the acid. Most of the aforementioned instruments are omitted from FIG. 1 for clarity but are described infra in connection with FIG. 7.

Figure 7:
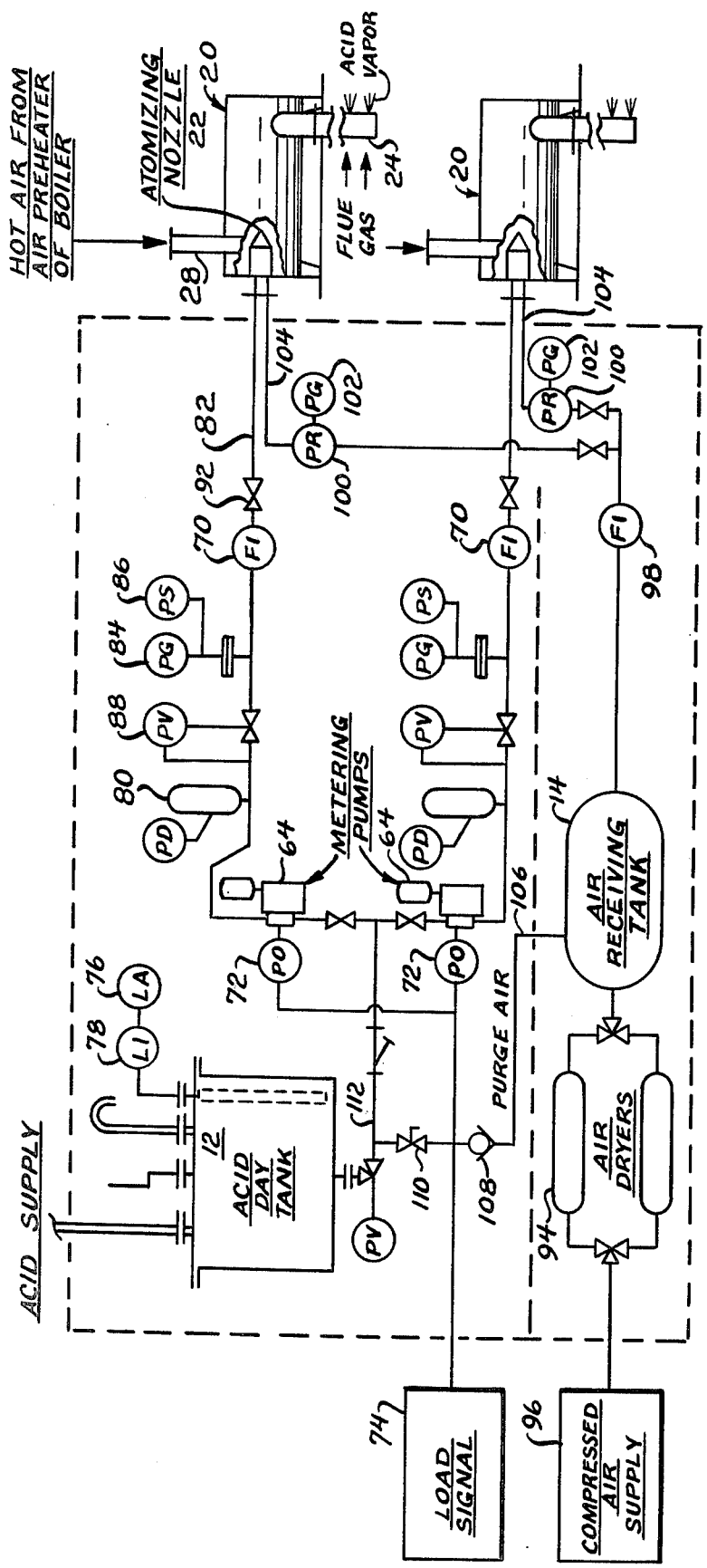
FIG. 7 is a schematic flow diagram of a typical type of gas conditioning apparatus.

FIG. 7 illustrates a schematic flow diagram of a gas conditioning system incorporating the invention which might be typically used in a commercial situation. The system illustrated in FIG. 7 utilizes a plurality of metering pumps 64 which are positive displacement pumps. The number of pumps used depends on the total flow required with a different pump being used for each single chamber 20 or a pair of chambers. The pumps pull in a given quantity of acid from the day tank 12 on the suction stroke and force it through the outlet on the pressure stroke. The quantity of acid delivered to and by each pump is determined by pneumatic output valves 72 which are operated by the load signal 74 in response to a parameter such as the volume of flue gases or the amount of SO3 in the flue gases downstream of the precipitator. Thus, the downstream piping resistance to flow does not materially effect the flow output of the metering pumps.

Referring to FIG. 7 in more detail, the acid day tank 12 includes high and low level alarms 76 and a level indicator 78. The acid is piped from the day tank 12 to the metering pump or pumps 64. As previously mentioned, the number of pumps 64 depends on the total flow required. The acid is piped from the pumps 64 through a pulsation dampener 80 which serves to smooth out the flow due to the piston strokes of the pump. The line 82 between the pulsation dampener 80 and the nozzles 22 includes a pressure gauge 84 for measuring the pressure, a pressure switch 86 which serves as an alarm for abnormal pressure conditions, a backpressure valve 88 which produces the pressure needed for the pump check valves (not shown) to close tightly, a flow indicator 70 to indicate that the pump is actually pumping and a shut-off valve 92 to close off the acid line. Air dryers 94 are provided for cleaning and drying the incoming air before it passes to an air receiving tank 14 which holds a supply for limited times when the supply 96 may fail. After the air leaves tank 14 it passes through a flow indicator 98 and then through a pressure regulator 100 and a pressure gauge 102 before passing through lines 104 which are connected to the nozzles 22. A purge line 106 containing a one way valve 108 and a flow control valve 110 is connected between the air tank 14 and the acid line 112 exiting the tank 12 so that the acid in the acid lines can be forced out when desired.

The optimum acid injection rate for the gas conditioning apparatus is the one that produces the best results in fly ash collection without acid carrying over past the precipitator. This rate is generally between 15-30 ppm acid to flue gas. The exact ratio will vary, however, with the flue gas rate, the coal analysis, plant operation, precipitator condition, and other variables.

One method of determining and controlling the acid injection rate is as follows. For a given coal the plant is operated at full rate and the acid injection through nozzles 22 is increased to the point of maximum precipitator collection efficiency as determined by observing the stack, observing the precipitator electrical performance parameters and/or taking flue gas samples. After the correct rate for the plant at full load is known, a signal 74 provided to the conditioning unit by the plant which is roughly proportional to the flue gas flow rate should provide automatic injection of the correct amount of acid. This signal is transmitted to the control valve 72 and permits the acid injection rate to drop proportionally to any drop in the flue gas flow rate. Thus, the amount of acid being injected can be kept in constant proportion to the flue gas. If a plant is operated near full load most of the time and uses a single type of coal the aforementioned control system is very dependable. If the plant burns several types of coals with different optimum acid injection rates for the different ones, a more sophisticated control system, such as one dependent on the SO3 content of the flue gas entering the precipitator can be used.

It is important that acid not be permitted to condense on the duct or precipitator surfaces since condensation is highly corrosive. Accordingly, a temperature set gauge 71 is provided to shut off the injection of acid if the flue gas temperature should get so low that the dew point of the acid might be reached. Although dew points typically range from 250° to 285° F. the set point is generally set at 285°-300° F. to provide a safety factor. The typical flue gas temperature would be 330° to 430° F.

It is difficult to predetermine the exact air pressure and acid pressure which will provide the best results in one of the nozzles 22 since it is virtually impossible to make two nozzles which will perform identically. However, it has been determined that satisfactory operation can be obtained if the air pressure value is at least about 10 psig above the fluid value. If the air pressure value is too high the spray pattern will be very wide and may angle back sufficiently about the nozzle to form droplets, defeating the purpose of the nozzle. If the air pressure is too high, it is also possible to cut off the flow of acid from the nozzle. If the air pressure is too low, no atomization will occur and the acid will dribble from the nozzle. In one nozzle that provided excellent results, the orifice opening 40 had a diameter of 0.053 inches while the holes 46 through which the acid passes had a diameter of 0.029 inches. Although there are pressure drops in the system which vary with the length of the lines 16, 18, a typical operating pressure for a nozzle might be 2.5 gph flow and 4 psig pressure for the acid and 2.5 SCFM flow and 38 psig pressure for the air. These pressures would be measured at pressure gauges 84, 102.

We claim as our invention:

1. Method of injecting an acid conditioning agent into a flue gas stream containing fly ash to be conditioned to enhance the efficiency with which the fly ash can be electrostatically precipitated comprising the steps of:
   passing a liquid acid conditioning agent under pressure through a first line into a nozzle holder incorporating a sonic atomizing nozzle at a temperature lower than its vaporizing temperature;

passing a gas from a first supply source under pressure through a second line into said nozzle, said nozzle incorporating means to produce sonic vibrations capable of breaking up said liquid acid into a mist plume having an average droplet size of about 10 microns;

passing a stream of hot gas from a second supply source having a temperature greater than the vaporization temperature of said liquid acid and of a value of at least about 500° F., tangentially into one end of a cylindrical chamber in which said nozzle holder and nozzle are mounted in such a manner that said stream of hot gas will travel in a helical manner and will entrain and vaporize substantially all of the acid mist plume emanating from said nozzle; and passing the stream of hot gas containing said vaporized acid into said flue gas stream after it has traversed the length of said cylindrical chamber.

2. The method of claim 1 wherein said conditioning agent comprises $H_2SO_4$ injected at a rate of 15-30 ppm acid to flue gas.

3. The method of claim 2 wherein the quantity of acid injected is automatically varied with changes in the flow rate for the flue gas stream.

4. The method of claim 3 wherein the volume of gas in said stream of hot gas is maintained constant while the quantity of acid injected into said hot gas is varied.

5. The method of claim 1 wherein said liquid acid conditioning agent is at ambient temperature when it is passed through the said first line into said nozzle holder.

6. The method of claim 4 wherein the stream of hot gas is tapped off from the air preheater for the boiler from which the flue gas stream is emanating.

7. The method of claim 1 wherein said nozzle is mounted on the axis of said cylindrical chamber and said chamber is positioned adjacent a duct containing said flue gas stream.

8. The method of claim 7 wherein said acid mist is introduced into said chamber by said nozzle at a location slightly downstream of the point at which the hot gas enters the chamber.

9. The method of claim 8 wherein said location is about 2 inches downstream from the point at which the hot gas enters the chamber.

10. An apparatus for injecting a vapor of liquid acid into a flue gas stream to condition fly ash in the stream and enhance the efficiency with which the fly ash can be electrostatically precipitated downstream of the apparatus comprising at least one cylindrical chamber positioned adjacent to and in communication with said flue gas stream; a source of liquid acid; a source of compressed air; at least one sonic nozzle for delivering an acid mist, said nozzle being mounted on a nozzle holder in said at least one chamber on the axis of said chamber near one end thereof; a pump for delivering acid to said nozzle under pressure; said nozzle being connected to said sources of acid and air by flow lines, said chamber having a tangential inlet opening near said one end in communication with a source of hot gas and an outlet opening near the other end thereof in communication with said flue gas stream, said openings being positioned to cause said hot gas to follow a helical path around and past the spray pattern of mist from said at least one nozzle to entrain the mist and vaporize it before it is injected into the flue gas stream.

11. An apparatus in accordance with claim 10 wherein said nozzle includes an axially positioned venturi shaped orifice through which air is directed in an axial direction and a plurality of radial openings extending outwardly from said orifice to an acid-containing chamber for delivering acid to said orifice where it is entrained in said air and carried outwardly.

12. An apparatus in accordance with claim 10 wherein said at least one sonic nozzle has air and acid supply lines connected to it for delivering air and acid at ambient temperature.

13. An apparatus in accordance with claim 10 wherein said source of hot gas is the combustion air preheater for a boiler from which the flue gas stream emanates.

14. An apparatus in accordance with claim 10 wherein said nozzle is mounted on said nozzle holder so as to inject a mist of acid slightly downstream of said tangential inlet opening.

15. An apparatus in accordance with claim 14 wherein said nozzle injects a mist about 2 inches downstream of said inlet opening.

16. An apparatus in accordance with claim 14 wherein said nozzle holder has a conically shaped forward end portion having an included angle of about 60°, said nozzle being positioned at the tip thereof with its sides flush with the walls of the nozzle holder.

17. An apparatus in accordance with claim 14 wherein both said inlet and outlet openings are positioned in the wall of the chamber so that the hot gas will enter and leave in a direction tangentially of the chamber.

* * * * *